United States Patent
Karcher

(10) Patent No.: US 8,957,619 B2
(45) Date of Patent: Feb. 17, 2015

(54) WIPER CONTROL

(75) Inventor: Hubertus Karcher, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 217 days.

(21) Appl. No.: 13/812,030

(22) PCT Filed: Jul. 28, 2011

(86) PCT No.: PCT/EP2011/063019
§ 371 (c)(1),
(2), (4) Date: Jan. 24, 2013

(87) PCT Pub. No.: WO2012/019924
PCT Pub. Date: Feb. 16, 2012

(65) Prior Publication Data
US 2013/0119911 A1    May 16, 2013

(30) Foreign Application Priority Data
Aug. 10, 2010 (DE) .......................... 10 2010 039 107

(51) Int. Cl.
| | | |
|---|---|---|
| G05B 5/00 | (2006.01) | |
| H02H 7/08 | (2006.01) | |
| H02P 1/04 | (2006.01) | |
| B60S 1/08 | (2006.01) | |
| B60S 1/04 | (2006.01) | |

(52) U.S. Cl.
CPC ................ B60S 1/0896 (2013.01); B60S 1/08 (2013.01); B60S 1/0463 (2013.01)
USPC ........................................................ 318/465

(58) Field of Classification Search
USPC ........................................................ 318/465
See application file for complete search history.

(56) References Cited

U.S. PATENT DOCUMENTS

| | | | | |
|---|---|---|---|---|
| 4,158,159 | A | * | 6/1979 | Orris et al. ..................... 318/443 |
| 4,339,698 | A | * | 7/1982 | Kearns .......................... 318/444 |
| 5,264,766 | A | * | 11/1993 | Tracht et al. .................. 318/443 |
| 6,306,220 | B1 | | 10/2001 | Zimmer |
| 2009/0282636 | A1 | | 11/2009 | Braun et al. |
| 2010/0139025 | A1 | | 6/2010 | Natsume |

FOREIGN PATENT DOCUMENTS

| | | |
|---|---|---|
| CN | 1522906 | 8/2004 |
| CN | 1608908 | 4/2005 |

(Continued)

OTHER PUBLICATIONS

International Search Report for Application No. PCT/EP2011/063019 dated Oct. 20, 2011 (English Translation and Original, 4 pages).

*Primary Examiner* — Erick Glass
(74) *Attorney, Agent, or Firm* — Michael Best & Friedrich LLP

(57) ABSTRACT

The invention relates to a method for controlling the movement of a wiper blade over a wiping surface, including the steps of moving the wiper blade up and down over the wiping surface between a lower turning position and an upper turning position, detecting a requirement to stop the wiper blade, moving the wiper blade downward into a lower end position and from there upward into a first parking position in the event that a reversing signal is present, and stopping the wiper blade. To this end, the wiper blade is moved into the lower end position only if previously thereto low mechanical resistance against the movement of the wiper blade over the wiping surface was determined.

10 Claims, 3 Drawing Sheets

(56) References Cited

FOREIGN PATENT DOCUMENTS

| | | |
|---|---|---|
| DE | 2504799 | 8/1976 |
| DE | 10128128 | 12/2002 |
| DE | 102007002269 | 7/2008 |
| EP | 1195301 | 4/2002 |
| WO | 2009138345 | 11/2009 |

\* cited by examiner

WIPER CONTROL

BACKGROUND OF THE INVENTION

The invention relates to a method and a device for controlling the movement of a wiper blade over a surface.

In order to rid a windscreen on a motor vehicle of contaminants and moisture, a wiper blade is moved across the screen in a reciprocal motion. For this purpose the wiper blade is usually mounted on a wiper arm, which is driven about a wiper shaft in an oscillatory motion. The wiper blade comprises a wiper lip, which rests on the windscreen and is pulled across it. The wiper lip is pulled by the wiper blade, so that for each change of direction of the wiper blade or the wiper arm, the wiper lip changes the side with which it is resting on the windscreen.

In order to avoid the wiper lip becoming brittle on one side, the wiper blade is moved prior to the wiper system stopping, so that the wiper lip is brought into a predetermined placement position. The placement position can, for example, be changed periodically, either under timer control or after a predetermined number of placements of the wiper lip in the same placement position. The placement positions of the wiper blade on the windscreen are always located in a lower area on the windscreen.

Investigations have shown that with dry or very dirty windscreens, a movement carried out by the wiper arm in order to bring the wiper lip into the predetermined placement position can cause the wiper arm to strike a boundary in the lowest area of the windscreen when starting from the placement position, because of elastic tensing of drive elements of the wiper arm. A noise effect connected to this can be perceived as unpleasant by a person near the wiper blade. Moreover, the service life of the wiper blade can be reduced by the impacts.

SUMMARY OF THE INVENTION

The object of the invention is to specify a method and a device for controlling the movement of a wiper blade across a surface, with which increased noise level during the process of stopping the wiper blade can be prevented.

A method according to the invention for controlling the movement of a wiper blade over a wiping surface comprises steps of the movement of the wiper blade up and down across the wiping surface between a lower turning position and an upper turning position. On detecting a request to stop the wiper blade, the wiper blade is moved to a downward movement in the vicinity of the lower turning position according to the above pattern. If there is a reversing signal, then the wiper blade is moved down into a lower end position and from there up into a first park position, before it is stopped. The wiper blade is, however, only then moved down into the lower end position, if a lower mechanical resistance against the movement of the wiper blade across the wiping surface has been previously detected.

If the movement of the wiper across the wiping surface has a high mechanical resistance, for example if the wiping surface is dry, then according to the invention the wiper will be prevented when stopping from being brought into a position that is so close to the lower end position that the wiper blade impinges on an external object because of elastic mechanical stresses in a wiper blade drive. An impingement of this type is then particularly probable, if an initially wet wiping surface is dried by means of the wiper blade, whereby moisture still remains in an area of the lower end position. If the wiper blade wipes across this area that is still moist during the stopping process, then the elastic stresses in the drive of the wiper blade will release suddenly, which can lead to striking through or impingement of the wiper blade on the external object.

If there is no reversing signal, then the wiper blade can be moved from the downward movement into a second park position and stopped there. The wiper blade can thus be removed from the wiping surface when the wiping movement is ended. Visual and aerodynamic advantages can result therefrom.

The first park position is preferably above the lower turning position and this is above the second park position. By means of said stresses and/or a mechanical play in the drive of the wiper blade, the wiper blade can be placed in the first or second park position in this way, whereby in each case the visual impression is given that the wiper blade would be in the same position. This position can coincide with the lower turning position.

In an alternative embodiment, the lower turning position corresponds to the second park position.

Independently of specific mechanical resistance, the wiper blade can be moved into the lower end position, depending on the reversing signal, if a speed signal lies above a predetermined threshold value. Above a predetermined speed, noise caused by striking through or impingement of the wiper blade can be relatively insignificant, so that the second park position can be approached directly and independently of the specific mechanical resistance.

The mechanical resistance of the movement of the wiper blade can be determined on the basis of a current consumption of an electrical drive device driving the wiper blade. A dedicated sensor for recording the mechanical resistance can thus be avoided, enabling cost advantages to result.

Upon a request to move the wiper blade again after stopping, the wiper blade can first be moved upwards. Turning of the wiper lip prior to the actual wiping process can thus be avoided and a rapid start-up of the wiper blade across the wiping area is supported, so that a cleaning process can be set going more rapidly.

The reversing signal can be switched over following a predetermined number of stopping processes. In particular, the reversing signal can be switched on and off, whereby the number of stopping processes until changeover is adapted to the current status of the reversing signal. Thus, for example, a first number of placement processes of the wiper lip in the upward direction is followed by a second number of placement processes of the wiper lip in the downward direction.

A computer program product with a program code means for carrying out the described method can run on a processing means or be stored on a computer-legible data medium.

A means according to the invention for controlling the movement of a wiper blade across a wiping surface comprises a drive device for moving the wiper blade up and down across the wiping surface between a lower turning position and an upper turning position, a first input means for detecting a request to stop the wiper blade, a second input means for detecting a mechanical resistance against the movement of the wiper blade across the wiping surface and a control means, which is configured to control the driving means to move the wiper blade downwards into a lower end position and from there upwards into a first park position, if there is a reversing signal. Thereby, the control means is further configured to only then move the wiper blade downwards into the lower end position, if the mechanical resistance lies below a predetermined threshold value.

BRIEF DESCRIPTION OF THE DRAWINGS

The invention is now described in detail with reference to the accompanying figures, in which.

DETAILED DESCRIPTION

Figure 1:
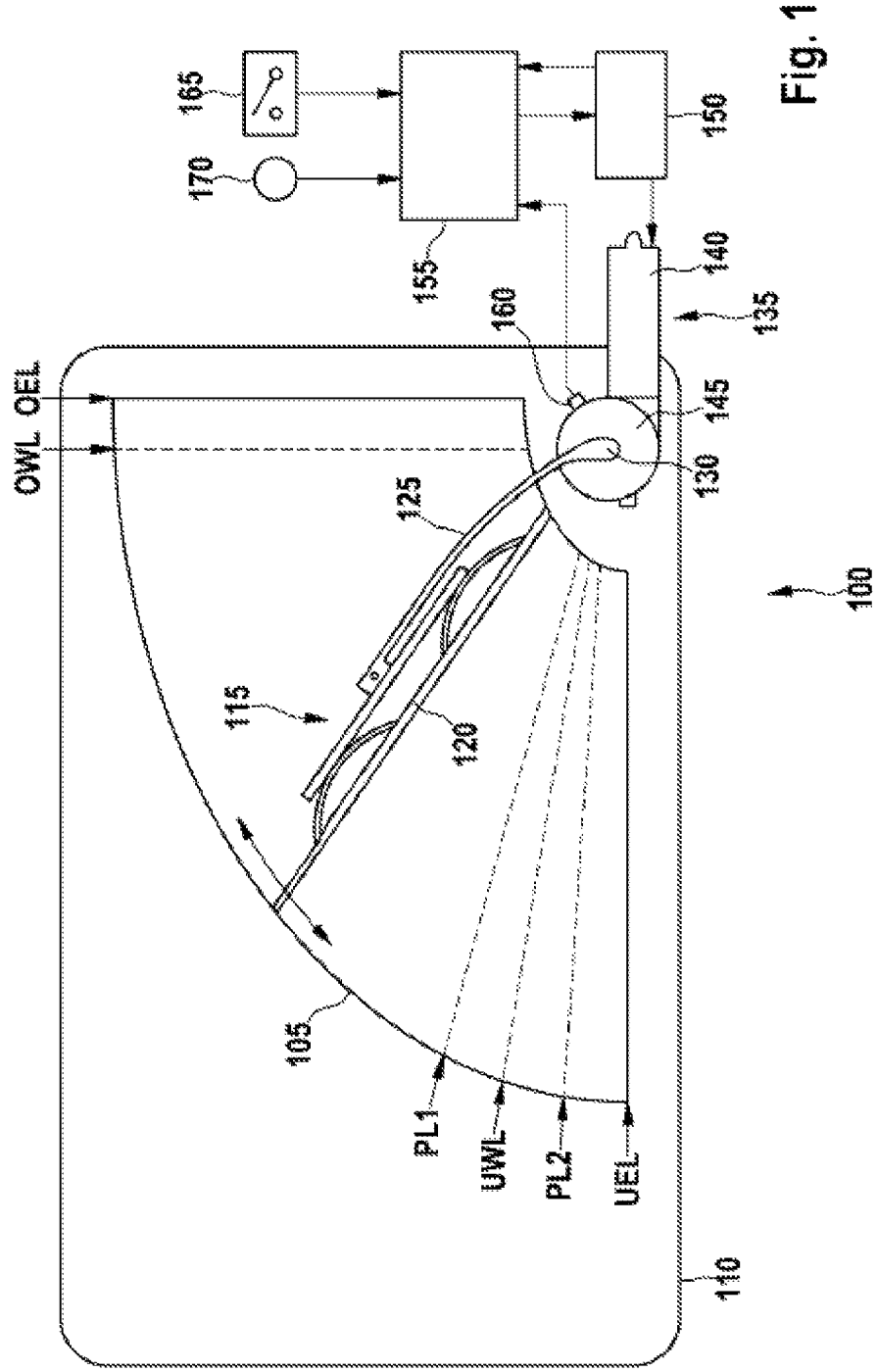
FIG. 1 represents a windscreen wiper system

FIG. 1 shows a windscreen wiper system 100 for use on a motor vehicle. A wiping area 105 of a windscreen 110 essentially has the shape of a circular segment with an opening angle of approx. 90°. A wiper-blade 115 with a wiper lip 120 is attached to a wiper shaft 130 by means of a wiper arm 125, which shaft can be moved by a drive motor 135. The drive motor 135 comprises an electric motor 140 with a gearbox 145. The gearbox 145 usually comprises a reduction gearbox, and in another embodiment additionally or alternatively a coupling gear with a linkage.

The electric motor 140 is coupled to a circuit breaker 150. The circuit breaker 150 is connected to a processing means 155 and is controlled by it. Depending on control signals from the processing means 155, the circuit breaker 150 provides to the electric motor 140 one or more voltages, which can be influenced in respect of their frequency, phase and/or polarity. A current sensor integrated into the circuit breaker 150 provides a signal to the processing means 155, which depends on an electric current flowing through the electric motor 140. The processing means 155 is connected to a position sensor 160, which senses a position of the wiper arm 125 or the wiper blade 115 on the wiping area 105. Preferably, the position sensor 160 is located on the gearbox 145 and can, for example, comprise a Hall-Sensor.

A wiper switch 165 is connected to the processing means 155. Using the wiper switch 165, an operator can turn on and off a movement of the wiper blade 115 across the wiping area 105 of the windscreen 110. Thereby, using the wiper switch 165, various movement speeds can be selected. The wiper switch 165 can also comprise an interval switch, so that the wiper arm 125 is moved periodically according to predetermined intervals. In relation to the present invention it is, however, sufficient to assume that by using the wiper switch 165 a continuous wiping movement of the wiper blade 115 can simply be switched on and off.

The processing means 155 is also connected to a speed sensor 170, which provides a signal, which is dependent on a speed of a motor vehicle in which the windscreen wiper system 100 is installed.

In another embodiment, the speed sensor 170 provides a signal, which is dependent on a wind speed in the vicinity of the windscreen 110. The signal provided by the speed sensor 170 can also be determined indirectly, for example on the basis of observation of the current flowing through the electric motor 140.

On the wiping area 105, various positions are specified qualitatively, which in their sequence from above to below have the following meanings:

upper end position (OEL): the highest position that can be reached by the wiper blade 115 in the wiping area 105;

upper turning position (OWL): that position, in which the wiper blade 115 transitions from an upward movement into a downward movement;

first park position (PL1): the position in which the wiper blade 115 is stopped, when it is in an upward movement;

lower turning position (UWL): in continuous wiping mode, that position in which the wiper blade 115 transitions from a downward movement into an upward movement;

second park position (PL2): that position in which the wiper blade 115 is stopped in a downward movement; and lower end position (UEL): the lowest achievable position of the wiper blade 115 in the wiping area 105.

Specific distances between the individual positions are not defined, but an angular region between the upper turning position OWL and the lower turning position UWL is usually maximized. Accordingly, the upper turning position OWL is in proximity to the upper end position OEL and the lower turning position UWL is in proximity to the lower end position UEL. An opening angle between the first park position PL1 and the second park position PL2 is usually approx. 2 to 3°.

Controlled by the wiper switch 165, in a continuous operation the wiper blade 115 is moved continuously back and forth between the upper turning position OWL and the lower turning position UWL, whereby the drive motor 140 runs in alternating directions. By means of the wiping movement of the wiper blade 115, a region between the turning positions OWL and UWL is cleaned or dried. The wiper lip 120 is always pulled by the wiper arm 125. In order to prevent premature wear of the wiper lip 120 when stopping the wiper arm 115, the wiper arm is stopped in a way that ensures that the wiper lip 120 points up and down alternately, i.e. that the wiper blade 115 is alternately stopped from a downward movement and from an upward movement. The wiper lip 120 is thus loaded less on one side, if the wiper arm 115 is not moving.

Should the wiper lip 120 point up after stopping the wiper arm 115, then following a request expressed via the wiper switch 165 to stop the wiper blade 115, the oscillating movement of the wiper blade 115 between the upper turning position OWL and the lower turning position UWL is first continued until the wiper blade 115 has reached the lower turning position UWL. From there the wiper blade 115 is moved still further to the second park position PL2 and is stopped there.

By contrast, should the wiper lip 120 on the wiper blade 115 point down after stopping the wiper blade 115, then after the request to stop expressed through the wiper switch 165, the wiper blade 115 is moved further as far as the lower turning position UWL, from there downwards to the lower end position UEL and back up to the first park position PL1.

In one embodiment, the upper park position PL1 can correspond to the lower turning position UWL. Further, the second park position PL2 can correspond to the lower end position UEL.

These two different stopping processes are controlled by the processing means 155, in that it senses the present position of the wiper blade 115 using the position sensor 160 and controls the circuit breaker 150, the direction of rotation and the angular speed of the electric motor 140 accordingly.

If by means of the wiper blade 115, by wiping between the upper turning position OWL and the lower turning position UWL, moisture is removed from the wiping area 105 on the windscreen 110, then the friction between the windscreen 110 and the wiping lip 120 or the wiper arm 125 increases. As a result, a current consumption of the electric motor 140 also increases. This current consumption is sensed by the processing means 155 via the circuit breaker 150. The processing means can be configured to regulate the speed of movement of the wiper blade 115 independently of the friction.

In the case of high friction, any existing play of the gearbox 145 between the electric motor 140 and the wiper arm 125 acts more strongly on the positioning of the wiper blade 115. There can also be elastic deformation of the gearbox 145 and/or the wiper arm 125. If the wiper lip 120 passes into an area underneath the lower turning position UWL, where the screen 110 is still wet, during a stopping operation, then the friction between the wiper lip 120 or the wiper blade 115 and the windscreen 110 suddenly reduces, resulting in the mechanical energy stored in the elastically deformed gearbox 145 and/or wiper arm 125 accelerating the wiper arm 115 downwards. The wiper arm 115 can thereby strike an external object, which can result in a noise nuisance.

According to the invention, for this purpose the processing means 155 is configured to detect a high level of friction between the wiper lip 120 or the wiper blade 115 and the windscreen 110 based on the current consumption of the electric motor 140 and to stop the movement of the wiper arm 115 only in such a way that the wiper lip 120 points up, for which purpose the wiper arm 115 is not moved below the lower turning position UWL prior to stopping, or is only moved below the lower turning position UWL to a small extent.

Figure 2:
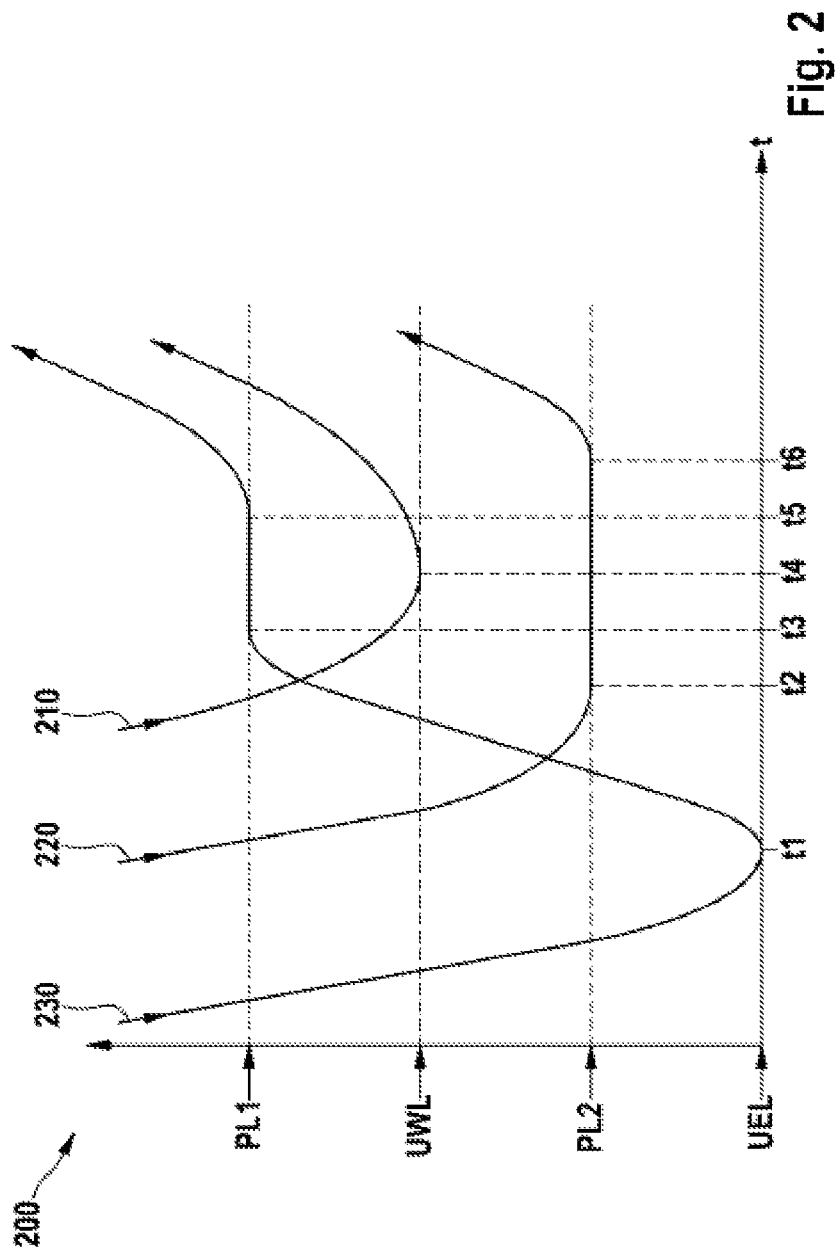
FIG. 2 represents a diagram with locus curves of the wiper blade from FIG. 1.

FIG. 2 shows a diagram 200 with locus curves of the wiper blade 115 from FIG. 1.

Time is plotted in the horizontal direction. Positions of the wiper blade 115 relative to the wiping area 105 are plotted according to their positions in FIG. 1.

The first locus curve 210 shows a movement of the wiper blade 115 for continuous wiping between the upper turning position OWL (not shown in FIG. 2) and the lower turning position UWL. The wiper blade 115 passes through the first park position PL1 from above, decelerates and reaches a stationary state at the lower turning position UWL at time T4. Immediately thereafter, the direction of motion of the wiper blade 115 reverses, the wiper blade 115 overtakes the wiper lip 120 and the wiper blade 115 accelerates upwards above the first park position P1.

The second locus curve 220 shows a movement of the wiper blade 115 into the second park position PL2. The wiper blade 115 approaches from above, first wipes over the first park position PL1 and then the lower turning position UWL, slows its movement and comes to rest at time T2 in the second park position PL2. The wiper lip 120 pulled by the wiper arm 115 is facing upwards. The wiper arm 115 remains here until a new request for screen cleaning at time T6. Then the wiper-blade 115 begins to move upwards again, whereby the wiper blade 115 overtakes the wiper lip 120, so that the latter folds over and points downwards from the wiper blade 115. The wiper blade 115 accelerates and moves further upwards.

The third locus curve 230 shows a movement of the wiper blade 115 when stopping in the first park position PL1. The wiper blade 115 approaches again from above, successively wipes over the first park position PL1, the lower turning position UWL and the second park position PL2, before it slows its movement and comes to rest at time Ti in the lower end position UEL. Immediately thereafter, the wiper blade 115 accelerates upwards again, whereby the wiper blade 115 overtakes the wiper lip 120, so that this flips over and faces down from the wiper lip 120. The wiper blade 115 travels over the second park position PL2 and the lower turning position UWL, in order to decelerate and to come to rest at time T3 in the first park position PL1.

The wiper lip 120 thereby faces down. The wiper blade 115 remains in the first park position PL1 until a new cleaning request occurs at time T5, in order to then accelerate upwards.

Figure 3:
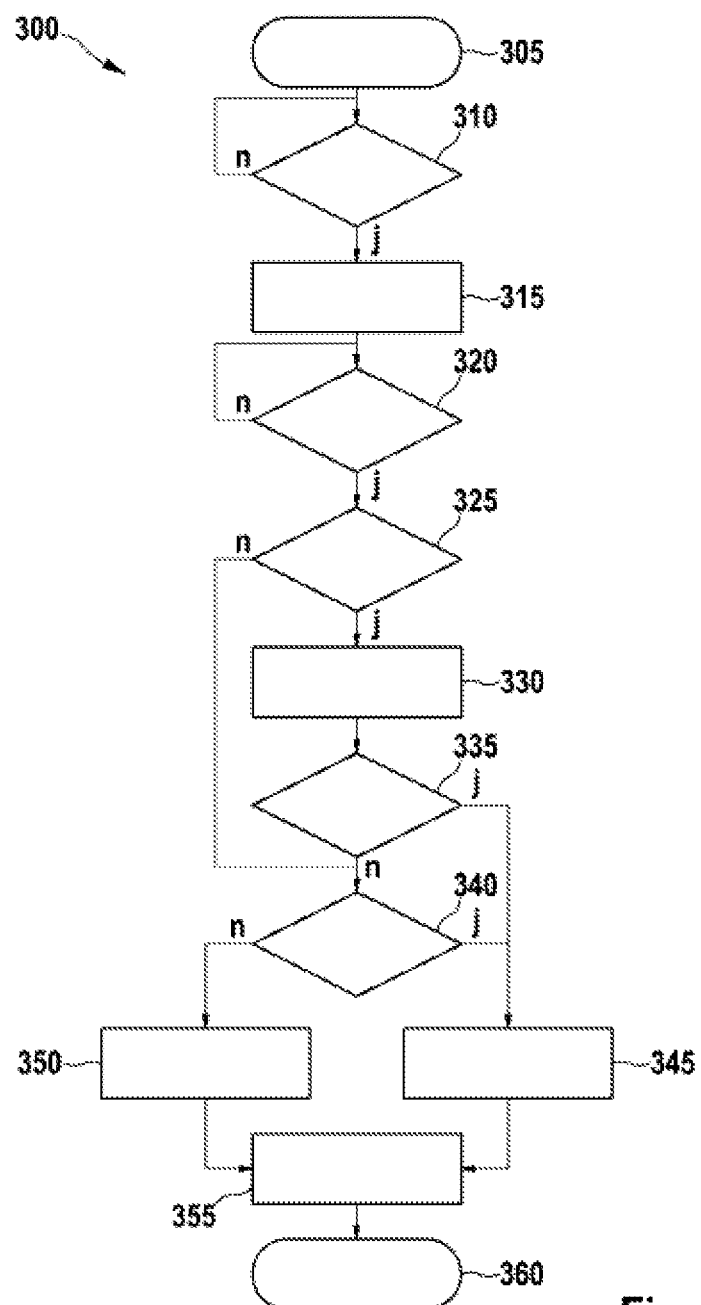
FIG. 3 represents a process diagram of a method for controlling the windscreen wiper system from FIG. 1.

FIG. 3 shows a process diagram of a method 300 for controlling the windscreen wiper system 100 from FIG. 1. In a step 305, the method 300 is in the starting state. In a following step 310 a check is made as to whether there is a request to move the wiper blade 115. This step is carried out repeatedly until the request is present, whereupon the wiper blade 115 is controlled in step 315 to perform a periodic movement between the upper turning position OWL and the lower turning position UWL. In a subsequent step 320, during which the wiper blade 115 is moved, a continuous check is made as to whether a request to stop the wiper blade 115 is present. As long as this request is not present, step 320 is repeated, whereby the wiper blade 115 remains in motion.

If the request to stop is present, a check is made in a step 325 as to whether a speed of a motor vehicle, in which the windscreen wiper system 100 is installed, is below a predetermined threshold value. If this is the case, then in a step 330 the electrical load is determined, which represents the electric motor 140 for the circuit breaker 150. This electric load, which is decisively determined by a current flow through the electric motor 140, depends on the mechanical load of the electric motor 140, which in turn is influenced by a coefficient of friction between the wiper blade 115 or the wiper lip 120 and the windscreen 110 in the wiping area 105. In step 335 a check is made as to whether the load determined in step 330 lies above a predetermined threshold value. This corresponds to an indirect determination of whether the windscreen 110 is dry in the area between the upper turning position OWL and the lower turning position UWL.

If this is not the case, then a check is made in step 340 as to whether there is a reversing signal. The reversing signal indicates whether the position of the wiper lip 120 relative to the wiper blade 115 has to be reversed or not, before the wiper blade 115 can be stopped. If the reversing signal is not present, then the wiper blade 115 is brought from above into the first park position P1 in step 345, so that the wiper lip 120 points upwards. However, if the reversing signal is present, then the wiper blade 115 is brought from above in step 350 according to the locus curve 230 in FIG. 2, first into the lower end position UEL and from there back up into the first park position PL1, so that the wiper lip 120 points downwards relative to the wiper arm 115.

Following step 345 or step 350, the wiper arm 125 is stopped in step 355.

If in step 335, by contrast, it is determined that the windscreen 110 is dry in the region between the upper turning position OWL and the lower turning position UWL, then step 340 is skipped and the stopping operation of the wiper blade 115 in step 345 is carried out irrespective of the presence or absence of the reversing signal.

Steps 330 and 335 are skipped if it is determined in step 325 that the speed of the motor vehicle in which the windscreen wiper system 100 is installed is above the predetermined threshold value. In this case, steps 330 and 335 are not implemented and the method is continued from step 325 in step 340, so that the reversing signal is again taken into account above a predetermined speed. Following step 355, the method 300 transitions into an end state 360.

The invention claimed is:

1. A method (300) for controlling the movement of a wiper blade (115) over a wiping surface (110), containing the following steps:

moving (315) the wiper blade (115) across the wiping surface (110) between a lower turning position (UWL) and an upper turning position (OWL);

detecting (320) a request to stop the wiper blade (110);

moving (345) the wiper blade (110) into a lower end position (UEL) and then into a first park position (PL1), if there is a reversing signal; and stopping (355) the wiper blade (115);

wherein the wiper blade (115) is moved downwards into the lower end position (UEL) after stopping (355) the wiper blade (115), if a low mechanical resistance against the movement of the wiper blade (115) over the wiping surface (110) has previously been determined.

2. The method (300) as claimed in claim 1, further comprising the step of moving (350) the wiper blade (115) into a second park position (PL2) if there is no reversing signal.

3. The method (300) as claimed in claim 2, wherein the first park position (PL1) is above the lower turning position (UWL) and above the second park position (PL2).

4. The method (300) as claimed in claim 1, wherein the lower turning position (UWL) corresponds to the second park position (PL2).

5. The method (300) as claimed in claim 1, wherein if a speed signal exceeds a predetermined threshold the wiper blade (115) is moved into the lower end position (UEL) irrespective of the determined mechanical resistance and depending on the reversing signal.

6. The method (300) as claimed in claim 1, wherein the mechanical resistance of the movement of the wiper blade (115) is determined based on a current consumption of an electrical drive (135) driving the wiper blade (115).

7. The method (300) as claimed in claim 1, wherein the wiper blade (115), after stopping initially moves upwards in response to a request (310) to move the wiper blade (115) again.

8. The method (300) as claimed in claim 1, wherein the reversing signal is switched over after a predetermined number of stopping processes (325-355).

9. A computer program product with a program code for carrying out the method (300) as claimed in claim 1, if it is run on a processing means (155) or stored on a non-transient computer-legible data medium.

10. A device (100) for controlling the movement of a wiper blade (115) across a wiping surface (110), comprising:
a drive (135) which moves the wiper blade (115) across the wiping surface (110) between a lower turning position (UWL) and an upper turning position (OWL);
a first input (165) which detects a request to stop the wiper blade (115);
a second input (150) which detects a mechanical resistance against the movement of the wiper blade (115) across the wiping surface (110);
a control (155), which is configured to control the drive (135) to move the wiper blade (115) into a lower end position (UEL) and from there into a first park position (PL1), if there is a reversing signal;
wherein the control (155) is also configured to move the wiper blade (115) into the lower end position (UEL), only if the mechanical resistance is below a predetermined threshold value.

\* \* \* \* \*